May 29, 1956

E. R. JOHNSON ET AL 2,748,297

SPECIAL REGULATING RHEOSTAT

Filed May 29, 1953

WITNESSES:
E. A. McCloskey.
Wm. B. Sellers.

INVENTORS
Edwin R. Johnson
and Donald E. Plumb.
BY
Paul E. Friedemann
ATTORNEY

May 29, 1956  E. R. JOHNSON ET AL  2,748,297
SPECIAL REGULATING RHEOSTAT

Filed May 29, 1953  3 Sheets-Sheet 2

WITNESSES:

INVENTORS
Edwin R. Johnson
and Donald E. Plumb.
BY
Paul E. Friedemann
ATTORNEY

May 29, 1956    E. R. JOHNSON ET AL    2,748,297
SPECIAL REGULATING RHEOSTAT
Filed May 29, 1953    3 Sheets-Sheet 3

WITNESSES:
E. A. M'Closkey.
Wm. B. Sellers.

INVENTORS
Edwin R. Johnson
and Donald E. Plumb.
BY
Paul E. Friedemann
ATTORNEY

United States Patent Office 2,748,297
Patented May 29, 1956

2,748,297

SPECIAL REGULATING RHEOSTAT

Edwin R. Johnson, Ironwood, Mich., and Donald E. Plumb, Williamsville, N. Y., assignors to Westinghouse Electric Corporation, East Pittsburgh, Pa., a corporation of Pennsylvania Application May 29, 1953, Serial No. 358,248

8 Claims. (Cl. 307—151)

Our invention relates to rheostatic apparatus and more particularly, to a regulating rheostat for controlling the speed of operation of an alternating current motor as, for example, a synchronous motor.

In a number of industrial applications, an electric motor is called upon for one portion of its operating cycle to drive its load at full speed, and for another portion of its operating cycle to drive its load at a speed that is a small fraction of the full speed.

Typical examples of such operating requirements may be found in steel mills, rubber mills, paper mills, and sugar mills. In a rubber mill as well as in a paper mill or steel mill, the threading speed, or some other adjusting speed, may be a relatively small inching speed. In sugar mills the centrifuges are, for the extraction of the liquid, operated at a high speed, but when the sugar is to be "plowed" from the centrifuge, the operating speed of the centrifuge must be a small fraction of its full speed.

The use of direct-current generators and rheostatic means for supplying a synchronous motor, or other alternating-current motor, with a low-frequency alternating current is known in the prior art; however, the devices of the prior art are inefficient and, above all, rather expensive. Further, they are heavy and bulky, thus taking up valuable space where space is often at a premium.

One broad object of our invention is the provision of apparatus that is efficient, simple, relatively small and inexpensive for supplying a low-frequency alternating current to a load.

Another object of our invention is the provision of a compact, simple, and inexpensive regulating rheostat.

A still further object of our invention is the provision of a potentiometer type rheostat for simultaneously and sequentially and continually reversing the current flows in a plurality of load circuits.

The objects recited are merely illustrative. Numerous other objects and advantages will become more apparent from a study of the following specification and the accompanying drawings, in which:

Figure 1 is a longitudinal sectional view of our regulating rheostat;

Figure 2:
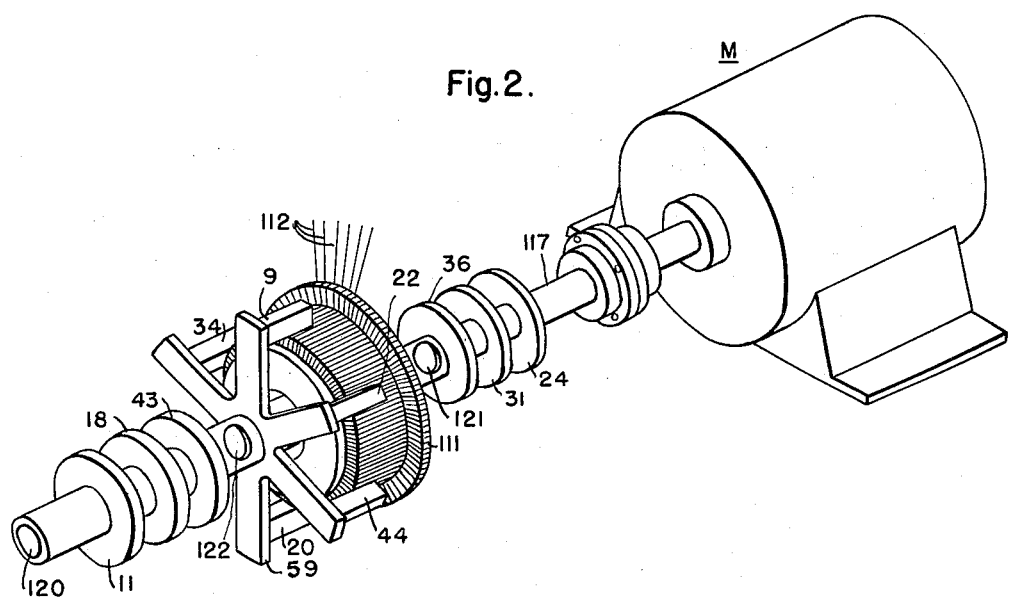
Fig. 2 is a perspective view, shown somewhat schematic, of the core portions of our regulating rheostat as coupled to its drive motor.

One of the valuable contributions to the trade made by our invention is the provision of a structure sufficiently simple and compact that all the essential switching means for the potentiometer type control rheostat CR are mounted within the housing usually used as the housing for a conventional motor. In Fig. 1 the base or housing 100 includes a cylindrical midportion or frame 101 and two end bells 102 and 103 rigidly secured to the frame 101. The frame is provided with a plurality of equally spaced projections 104, preferably three or more, directed radially inward of the frame 101. To these projections the spider, or ring, 105 is rigidly secured by bolts 106. The inner portion of the spider 105 carries an annulus 107 having a square-section welded to the spider 105. A sleeve 108 is rigidly held in axial alignment with the housing by means of the nut 109.

A second nut 110 has threaded engagement with the left-hand end of the sleeve 108 and is used to firmly mount a conventional motor commutator structure 111 on the sleeve 108 as shown. The commutator is thus mounted concentric with the housing axis and rigidly on the housing. For the particular application of our invention in a steel mill drive, we utilize eighty-one commutator segments. Each segment is secured to its own lead, and the leads 112, in an assembled group, emerge from the frame 101 through a suitable opening and from thence lead to and are connected to the respective junctions on the control rheostat CR mounted on a suitable panel not too remote from the commutator.

The end bells 102 and 103 are provided with suitable bearing hubs 113 and 114 for receiving the outer race of the bearings 115 and 116, respectively. The inner races of the bearings are shrunk fit, or press fit, on the shaft 117. A brush-holder assembly, including the suitable elements of insulating material shown, is attached to the bracket 98 on the end bell 102 by the bolts 118. A similar brush-holder assembly, including the suitable elements of insulating material shown, is attached to the bracket 99 on end-bell 103 by bolts 119.

The slip rings 11, 18 and 43 are cast in an insulating plastic material as shown, which insulating material is pressed on shaft 117 and rotates with this shaft. The slip-rings 24, 31 and 36 are similarly cast in the insulating plastic material shown and this insulating material is pressed on shaft 117 and thus rotates with this shaft.

Figure 3:
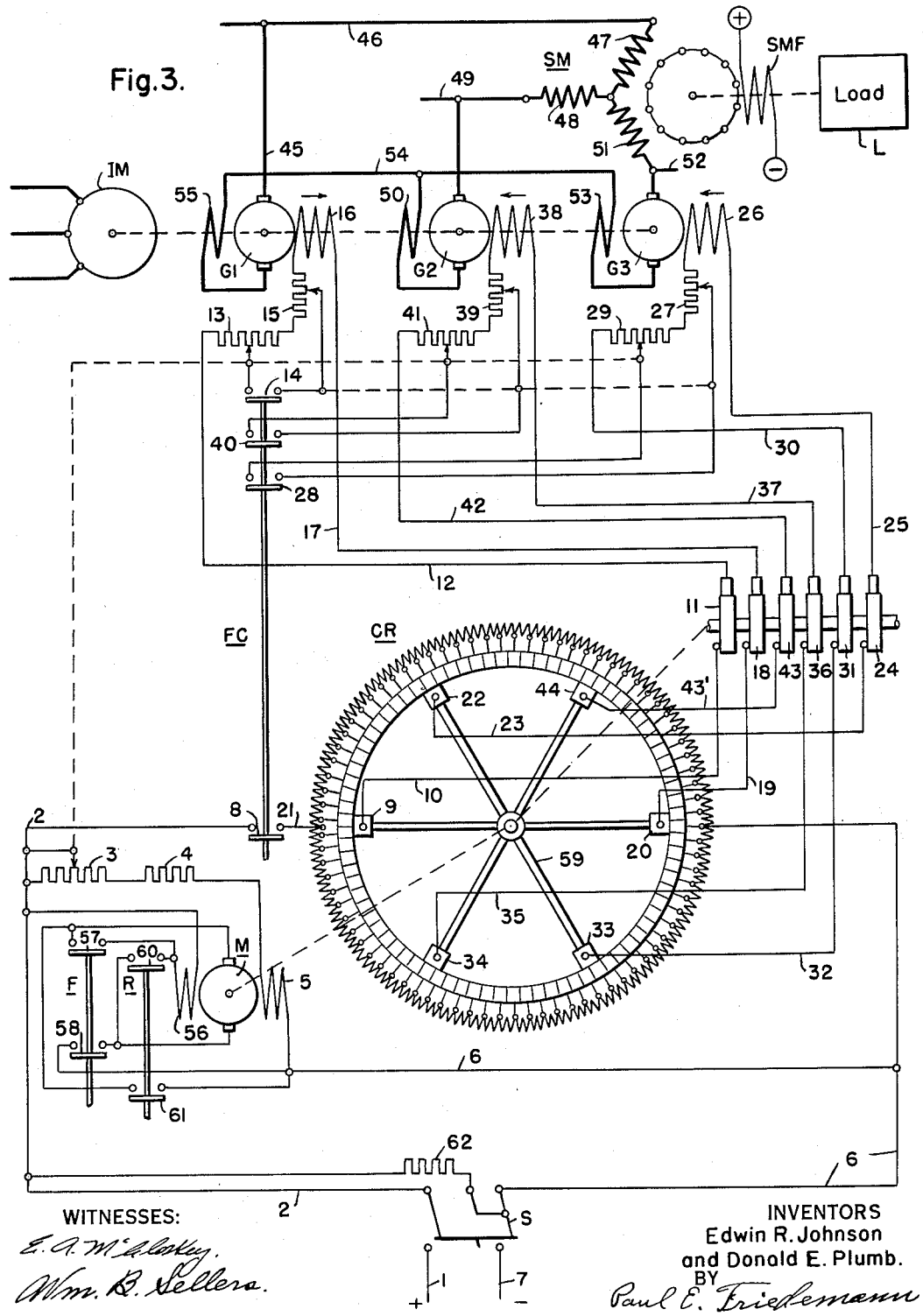
Fig. 3 is a diagrammatic showing of our invention as applied to drive a synchronous motor.

The shaft 117 is provided with an axial opening 120 from the left end to the region of the opening 121. The rings 24, 31 and 36 are electrically connected to the conductors 23, 32, and 35, respectively. These conductors 23, 32 and 35 enter openings 121 and traverse the axial opening 120 of the shaft 117 and emerge at opening 122 to the left of the commutator 111. The conductors 23, 32 and 35 are electrically connected to the brush holders and the brushes 22, 33 and 34, respectively. (See Fig. 3.) The rings 11, 18 and 43 are electrically connected to conductors 10, 19 and 43', respectively, which in turn are electrically connected to the brush holders and the brushes 9, 20 and 44, respectively.

A suitable ring 123 is press-fit on shaft 117 just to the right of the opening 122. To this ring the spider 59 of insulating material is rigidly secured by the bolt and nuts 124. The spider 59, having six arms spaced at 60° intervals, carries the six conducting brushes 9, 22, 44, 20, 33, and 34. One brush is mounted on each arm and the disposition in such that the brushes engage the surface of the commutator at six circumferentially equally spaced points.

To fully appreciate the merits of our invention, it might be noted that our regulating rheostatic means is much smaller than the known prior art device which it is to replace. The known prior art structure is slightly over 33" wide, 45" high and 50" deep, whereas our structure for the same rating is about 11" wide, 16" deep, and 50" long. The volumetric space occupied by the prior art device is thus more than three times as great as our device. Further, the price of our device is about two-thirds only of the price of the old, or prior art device.

In actual use, the housing 100 and the motor M for driving the shaft 117 are mounted on the same base and constitute a unit of the whole equipment.

A still better understanding of our invention may be had from a study of its operation as applied, for example, to the speed control of a synchronous motor.

If the attendant wishes to start and run the synchronous motor SM at any selected relatively low speed, as an inching or threading speed, he causes the induction motor IM to operate at full speed to drive the direct-current generators G1, G2, and G3 at full speed, and he makes sure that the synchronous motor field SMF is fully excited to provide the necessary starting and running torque for the synchronous motor when the stator or alternating-current windings are energized from the generators G1, G2 and G3.

By closing the switch S, a circuit is established from the positive bus 1 through the left-hand element of switch S, conductor 2, a portion of the field rheostat 3, the fixed resistor 4, the field winding 5 of the motor M, conductor 6, the right-hand element of switch S to the negative bus 7.

The system of control includes a master controller (not shown) and a number of other items (also not shown) for effecting the operation of the electromagnetically actuated field control contactor FC and the electromagnetically actuated reversing contactors F and R. If the synchronous motor is to operate in the forward direction, the contactors FC and F are actuated, whereas if the synchronous motor is to operate in the reverse direction, then contactors FC and R are actuated.

Figure 4:
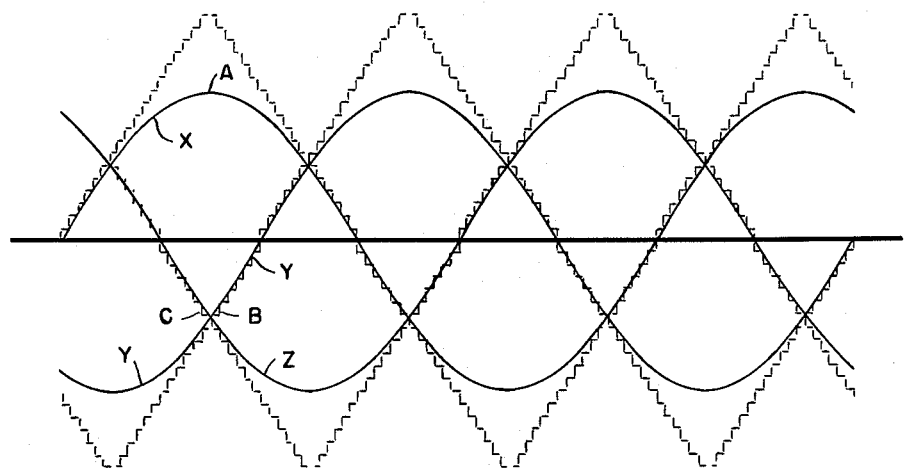
Fig. 4 shows some curves illustrating the operation of our invention.

For a forward operation of the synchronous motor SM, the contactor FC is first closed, whereupon a first circuit is established from conductor 2 through the contacts 8 of contactor FC, lead 21, to the commutator segments shorted by the brush 9, conductor 10 to slip ring 11, conductor 12, a few sections of resistor 13, contacts 14, a few sections of resistor 15, the field winding 16, conductor 17, slip ring 18, conductor 19, brush 20, to the negatively energized conductor 6. The field winding 16 will be excited in the direction indicated by the arrow adjacent the winding 16 and the magnitude of the excitation will thus be a maximum. In consequence, the voltage output of generator G1 will be a maximum, being of a magnitude as indicated by point A on curve X in Fig. 4.

A second circuit is established from positive conductor 2 through the contacts 8, all of the resistor sections over a 60° arc of control rheostat CR from the conductor 21 to the commutator segments engaged by brush 22, conductor 23, slip ring 24, conductor 25, field winding 26, a few sections of the resistor 27, contacts 28 on contactor FC, a few sections of the resistor 29, conductor 30, slip ring 31, conductor 32, brush 33, all of the resistor sections over a 60° arc of rheostat CR from brush 33 to the connection of the negative conductor 6. The field 26 will thus be excited in the direction indicated by the arrow adjacent the field winding 26, tending to produce a voltage output for generator G3 as represented by point B on curve Y in Fig. 4.

A third circuit is established from the positive junctions 21 through all the resistor sections over a 60° arc on control rheostat CR from the junction 21 to the brush 34, engaging the commutator, conductor 35, slip ring 36, conductor 37, field winding 38, a few of the resistor sections of resistor 39, contacts 40 on the control contactor CF, a few of the resistor sections of resistor 41, conductor 42, slip ring 43, brush 44, all the resistor sections over a 60° arc of rheostat CR to the connection of the negative conductor 6. The field winding 38 will thus be excited in the direction indicated by the arrow adjacent the field winding 38, tending to produce a voltage output in the sense indicated by point C on curve Z in Fig. 4.

The output for generator G1 may be traced from the positive terminal 45 to the alternating-current supply bus 46, the first phase winding 47 of the synchronous motor SM, the parallel circuit comprising the series circuit including the second phase winding 48, the supply bus 49, the armature of the generator G2 and the series differential field 50 and the second series circuit including the third phase winding 51, the supply bus 52, the armature of the generator G3 and the series differential field 53, the common lead 54, the series differential field 55 to the negative terminal of the generator G1.

To start the motor SM in the forward direction, the forward directional contactor F is caused to operate, whereupon a circuit is established from the positive conductor 2 through the series field winding 56 of the motor M, the contacts 57 on contactor F, the armature of motor M, contacts 58 on contactor F to the negative conductor 6.

The motor M thus starts rotating in a direction to rotate the brushes 9, 22, 44, 20, 33 and 34 mounted on the spider 59 in a clockwise direction. As the brushes change positions, the voltage of generator G1 changes as indicated by curve X (see Fig. 4), the voltage of generator G2 changes as indicated by curve Y, and the voltage of generator G3 changes as indicated by curve Z.

From the voltage changes indicated by the curves, it is apparent that an alternating current of a relatively low frequency is supplied to the synchronous motor SM, the frequency depending on the speed of the motor M. The speed control rheostat 3 is ganged with the adjusting arms for the resistors, or rheostats 13, 41 and 29, so that the voltage supplied to the motor SM, may be controlled as a function of the frequency of the current supplied to the synchronous motor SM. As shown, the voltage adjustment of the generators G1, G2 and G3 is upward with a decrease in speed of motor M. The adjustment may also be in an opposite sense. Such opposite sense adjustment is readily accomplished by merely connecting the rheostat 3 so that the speed increases as the rheostat lead on rheostat 3 is moved to the right.

When the motor SM is to operate in a reverse sense, contacts 57 and 58 are opened, and contacts 60 and 61 are closed. To prevent damage to the field windings when either contacts 57 and 58 or contacts 60 and 61 are opened or switch S is opened, the discharge resistor 62 is connected across the leads 2 and 6.

The voltage level of the generators G1, G2, and G3 may be individually adjusted or may be simultaneously adjusted as indicated by the ganged leads for the resistors 15, 39, and 27.

It will be noted that the series fields 55, 50, and 53 always act differentially respectively with respect to the fields 16, 38, and 26. This fact plus the inductive load characteristics of the components in the circuits of the generators G1, G2, and G3 provide for a smooth voltage change on the synchronous motor and for a smoothly rotating flux in the motor.

While we have gone to some extent in explaining the circuit arrangement of our invention and the function of the circuits, the invention resides more particularly in the novel construction and function of our regulating rheostat. However it is thought that a full understanding of the circuits and their function will aid in a full appreciation of the merits of our invention.

While we have disclosed but one embodiment of our invention, it is understood that our invention is capable of various adaptations, and that changes and modifications may be made or substitutions resorted to all within the spirit of the invention.

We claim as our invention:

1. In apparatus for effecting the operation of a motor operated rheostat, in combination, a frame structure in design and construction substantially like the housing of an electric motor and thus having a mid part and end bells on said part provided with bearings, a shaft disposed in said bearings, a sleeve disposed in spaced relation about the shaft and supported by said mid part, a commutator having a selected number of bars mounted on the sleeve, a resistor connected in a loop circuit, said bars from the first to the last being connected, through suitable leads, at equally spaced points on said resistor, a pair of terminals energized with direct current, one of said terminals being connected at one point on the resistor and the other terminal being connected at the diametrically opposite point on the resistor, a plurality of brushes secured to the shaft for rotation therewith, said brushes being disposed to ride on the commutator, and a plurality of load circuits connected to said brushes.

2. In apparatus for controlling the operation of a resistor, in combination, a housing having a generally cylindrical mid-part and two end bells mounted one on each end of said part, bearings in the end bells, a shaft mounted in the bearings, a commutator having a selected number of bars mounted on said part and disposed about said shaft in spaced relation to the shaft, a resistor connected in a loop circuit energized with direct current at diametrically opposite points, said commutator bars being connected to said resistor at substantially equally spaced points, a pair of brushes angularly spaced with respect to each other operatively coupled to the shaft and engaging said commutator, and a load circuit connected to said brushes.

3. In apparatus for controlling the energization of a load circuit from a potentiometer resistor, in combination, a frame in design and construction substantially the same as the frame of an electric motor, a commutator mounted in fixed relation to the frame and in axial alignment with the frame, a shaft disposed in concentric relation to the commutator but in spaced relation thereto, a potentiometer resistor not disposed on said frame connected in a loop circuit, said potentiometer resistor being energized with direct current at diametrically opposite points, circuit connections for connecting the commutator bars at equally spaced points on the resistor, a pair of brushes disposed diametrically opposite each other secured to the shaft and riding on the commutator, and a load unit electrically connected across said brushes.

4. In apparatus for controlling the energization of a load circuit, in combination, a motor frame including a mid part, end bells, bearings in the end bells, and a shaft in the bearings, a direct-current-motor commutator having bars mounted concentrically about the shaft in spaced relation thereto and fixed to the mid part, a resistor, connected to a suitable voltage, having successive sections connected to said bars, brushes coupled to the shaft riding on the commutator, and a load unit connected across said brushes.

5. In apparatus for controlling the energization of a load circuit, in combination, a frame having a mid-part and an end bell at each end to thus comprise a frame structure substantially like the frame structure of an electric motor, a commutator mounted rigidly on the frame in concentric relation to the frame, a resistor connected in a loop circuit and energized with direct current at substantially opposite points on the loop, the bars of the commutator being connected at spaced points on the resistor loop, a pair of spaced brushes disposed to ride over the commutator, and a load unit connected to the brushes.

6. In apparatus for effecting the operation of a motor operated rheostat including a resistor connected upon itself in a loop circuit and energized with direct current from a suitable source connected across a pair of diametrically opposite points, the combination of, a frame structure in design and construction substantially like the housing of an electric motor and thus having a middle part and two end bells respectively on the ends of the middle part, said end bells being provided with bearings, a shaft disposed in said bearings, a sleeve disposed in space relation about said shaft and rigidly supported on said middle part, a commutator having a selected number of bars mounted on the sleeve, said bars from the first to the last being connected, through suitable leads, at equally spaced points on said resistor, a plurality of brushes secured to the shaft for rotation therewith, said brushes being disposed to ride on said commutator, and a plurality of load circuits connected to said brushes.

7. In apparatus for effecting the operation of a motor operated rheostat including a resistor connected upon itself in a loop circuit and energized with direct current from a suitable source connected across a pair of diametrically opposite points, the combination of, a housing having a generally cylindrical middle part and two end bells mounted one on each end of said part, bearings in the end bells, a shaft mounted for rotation in the bearings, a commutator having a selected number of bars mounted rigidly on said part and disposed about said shaft, said commutator bars being connected to said resistor at substantially equally spaced points, a pair of brushes angularly spaced with respect to each other coupled to the shaft and engaging said commutator, and a load circuit connected to said brushes.

8. In apparatus for controlling the energization of a load circuit from a potentiometer resistor connected upon itself in a loop circuit and energized from a suitable source of direct current connected across diametrically opposite points of the loop circuit, the combination of, a frame in design and construction substantially the same as the frame of an electric motor, a commutator mounted in fixed relation to the frame in the frame and in coaxial relation to the frame, a shaft disposed in coaxial relation to the commutator mounted for rotation in the frame and being in spaced relation from the commutator, circuit connection for connecting the commutator bars to equally spaced points on the potentiometer resistor, a pair of brushes disposed diametrically opposite each other secured to the shaft but electrically insulated therefrom, said brushes being disposed to ride on the commutator, and a load unit electrically connected across said brushes.

References Cited in the file of this patent
UNITED STATES PATENTS 1,598,268    Deconinck _____ Aug. 31, 1926